United States Patent
Coulbeck et al.

(10) Patent No.: US 10,246,584 B2
(45) Date of Patent: Apr. 2, 2019

(54) ADDITIVE TO PREVENT PHASE SEPARATION OF LOW PROFILE ADDITIVE IN UNSATURATED THERMOSET POLYESTER COMPOSITIONS

(71) Applicant: Lubrizol Advanced Materials, Inc., Cleveland, OH (US)

(72) Inventors: Elliot Coulbeck, Bury (GB); Dean Thetford, Rochdale (GB); Patrick J. Sunderland, Rossendale (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 113 days.

(21) Appl. No.: 15/533,629

(22) PCT Filed: Nov. 13, 2015

(86) PCT No.: PCT/US2015/060495
§ 371 (c)(1),
(2) Date: Jun. 6, 2017

(87) PCT Pub. No.: WO2016/094026
PCT Pub. Date: Jun. 16, 2016

(65) Prior Publication Data
US 2018/0265696 A1    Sep. 20, 2018

Related U.S. Application Data

(60) Provisional application No. 62/089,437, filed on Dec. 9, 2014.

(51) Int. Cl.
| | |
|---|---|
| *C08L 67/02* | (2006.01) |
| *C08L 25/06* | (2006.01) |
| *C08G 69/40* | (2006.01) |
| *C08F 283/01* | (2006.01) |
| *C08F 290/00* | (2006.01) |
| *C08G 65/26* | (2006.01) |
| *C08G 65/333* | (2006.01) |

(52) U.S. Cl.
CPC ............ *C08L 67/02* (2013.01); *C08F 283/01* (2013.01); *C08F 290/00* (2013.01); *C08G 65/2606* (2013.01); *C08G 65/2609* (2013.01); *C08G 65/2612* (2013.01); *C08G 65/3331* (2013.01); *C08G 65/33303* (2013.01); *C08G 65/33306* (2013.01); *C08G 65/33313* (2013.01); *C08G 65/33368* (2013.01); *C08G 65/33372* (2013.01); *C08L 25/06* (2013.01); *C08G 2650/50* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,172,102 A | 10/1979 | Hoene et al. | |
| 5,162,401 A * | 11/1992 | Ross | C08L 67/06 523/507 |
| 2008/0125540 A1 * | 5/2008 | Thetford | C09D 11/03 524/608 |

FOREIGN PATENT DOCUMENTS

| | | |
|---|---|---|
| EP | 0451258 A1 | 10/1991 |
| EP | 1648970 A2 | 4/2006 |
| EP | 2093254 A1 | 8/2009 |
| WO | 2016/094026 A1 | 6/2016 |

OTHER PUBLICATIONS

Search Report of Corresponding International Application No. PCT/US2015/060495 dated Feb. 12, 2016.
Written Opinion of Corresponding International Application No. PCT/US2015/060495 dated Feb. 12, 2016.

* cited by examiner

*Primary Examiner* — Christopher M Rodd
(74) *Attorney, Agent, or Firm* — Samuel Laferty; Teresan Gilbert

(57) ABSTRACT

The present invention relates to an additive to prevent phase separation between a low profile additive and the other components of the molding composition, said other components comprising at least an unsaturated resin and an unsaturated monomer.

20 Claims, No Drawings

ADDITIVE TO PREVENT PHASE SEPARATION OF LOW PROFILE ADDITIVE IN UNSATURATED THERMOSET POLYESTER COMPOSITIONS

CROSS REFERENCE TO RELATED APPLICATION

This application is a national phase entry under 35 U.S.C. 371 of PCT/US2015/060495 filed Nov. 13, 2015, which claims the benefit of U.S. Provisional Application No. 62/089,437 filed Dec. 9, 2014.

FIELD OF INVENTION

The present invention method and an additive to prevent phase separation of low profile additives from solutions of unsaturated polyesters in reactive monomer. Typically, the low profile additives are polymeric species dispersed in reactive monomer(s). The additive of this disclosure is a reaction product of an aminic polybasic species with a polyether functionalized with an aryl group containing one unreacted carboxylic acid.

BACKGROUND OF THE INVENTION

US 2005/0120911 teaches a polyether functionalized with an aromatic group having a carboxylic acid group. The molecule of the reference is used as a dispersant.

US 2005/277745A1 discusses impact resistant, low shrinkage reinforced molding compositions.

U.S. Pat. No. 6,815,499 discusses compatibilizing agent, radical copolymerizable, unsaturated resin compositions, molding material, and molded article.

It would be desirable if additional additives could be developed to prevent the phase separation of low profile additives from unsaturated resin molding compositions crosslinked with unsaturated monomers and optionally reinforced with fibers or particulate.

SUMMARY OF THE INVENTION

The additive was prepared by reaction of a mono-nucleophilic polyetheramine and/or polyether alcohol with a multi-carboxylic aromatic acid, its anhydride, ester or acid chloride derivative forming a mono-carboxylic acid functionalized polyether component followed by reaction of said mono-carboxylic acid functionalized polyether component with multi amine component such as multi-amine polymers such as PEI. The reaction between the mono-nucleophilic polyetheramine and/or polyether alcohol and one or two acid groups of the multi-carboxylic aromatic species forms an ester, amide, or imide linkage between the polyether and the aryl group. Desirably, the aryl group of the multi-carboxylic aromatic acid has 2 to 3 carboxylic acid groups directly attached to the ring or attached via a spacer group of 1, 2, or 3 carbon atoms. Optionally, the aryl group can be further substituted with $C_{1-4}$ alkyl groups, halide group(s) and $NO_2$ group(s). The polyether can comprise ethylene oxide, propylene oxide, or butylene oxide but preferably has more combined repeat units of propylene and butylene oxide than ethylene oxide.

This additive has been shown to have good anti-separation properties in non-aqueous unsaturated resin and unsaturated monomer medium such as mixed SMC resin formulations. They prevent phase separation of a phase of unsaturated resins dissolved or swollen with unsaturated monomer from a second phase of low profile additive selected from dispersion of addition polymerized thermoplastics or elastomers optionally in unsaturated monomers, such as high MW polystyrene or polyolefin resins dispersed in styrene monomer.

The low profile additives are desirable as they minimize shrinkage related deformations, surface unevenness, and residual manufacturing stresses in the molded articles from unsaturated resins crosslinked via polymerizations of unsaturated monomers, such as SMC and BMC. Low profile additives facilitate more precise dimensions, less residual stress, and less surface unevenness allowing molded unsaturated polyesters to compete against other technologies requiring close dimensional tolerances and smooth surface quality. However, the low profile additives only function effectively if evenly dispersed as nanometer or micrometer sized phases throughout the unsaturated resin and unsaturated monomer during molding. It would be desirable to stabilize the low profile additive dispersion in the molding resin against phase migration for several hours or days such that molding resins with well dispersed low profile additives could be prepared and stored for hours or days prior to actual molding and/or retained for hours or days if molding equipment is unavailable or needs repair prior to molding the parts.

Filler and fiber reinforced molding compositions that use low profile additive present a problem if the low profile additive phase tries to phase separate from the unsaturated resin phase prior to actual molding and cure. The physical integrity or dimensions of the fibers and fillers may prevent remixing of the phase separated low profile additive into the unsaturated resin phase if oriented fibers or fillers are present.

DETAILED DESCRIPTION OF THE INVENTION

The present invention provides a composition of an unsaturated resin dispersed in an unsaturated monomer, a low profile additive, a curative for the unsaturated resin and unsaturated monomer, an additive to prevent phase separation of the low profile additive from the unsaturated resin, and various optional additives for the composition to facilitate molding or particular end uses.

For simplicity we will explain the function of low profile additives in SMC (sheet molding compounds) with the understanding that these additives function equivalently in hand lay-up molding, die molding, filament winding, injection molding and other miscellaneous molding operations of unsaturated resins crosslinked with unsaturated monomers and used as molding compositions.

Low profile additives (LPA) are used as part of Sheet Molding Compounding (SMC) resin formulation, their role is to minimize the unsaturated polyester resin (UPE) from shrinking when being molded. As such, LPAs are blended with the other components of the resin mixture (mainly UPE resin) which is in turn used to produce the sheets of SMC. The process of making the SMC sheets however can take time and often means that the resin mixture is left to stand after being blended before it can all be used. This is where a potential phase separation problem occurs because the blended mixture of LPA and UPE is not a stable blend and starts to separate out with time (this can be as quickly as 30 minutes after blending as shown in the comparative example data).

As such, an anti-separation additive is desirable so that the LPA and UPE resins do not separate out, with the understanding that the longer that separation can be prevented the better. As this gives a longer potential processing time window and flexibility to the SMC producer, for example they can blend the resin mixture in larger batch sizes and therefore reduce costs.

The product/s outlined in this document act as effective anti-separation additives for mixtures of LPA and unsaturated resins in unsaturated monomer, especially when the LPA resin is polystyrene dispersed in styrene monomer.

The additive to prevent phase separation is a reaction product of a functionalized polyether with an aminic polybasic species. The functionalized polyether can be defined by a formula:

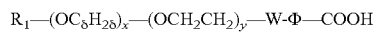

$$R_1-(OC_\delta H_{2\delta})_x-(OCH_2CH_2)_y-W-\Phi-COOH$$

wherein:
$R_1$ is a $C_1$-$C_{36}$ hydrocarbyl group, desirably $C_1$-$C_{18}$ which can be a cyclic, branched, or non-branched alkyl; aryl; alkylaryl or arylalkyl,
$\delta$ is 3 and/or 4,
x is 10-60, especially 10-40,
y is 0-10, especially 0,
the —(OC$_2$H$_4$) and —(OC$_\delta$H$_{2\delta}$) repeat units can be in any order such as random or blocky and $_y$ must be less than $_x$,
W is an ester, imide, or optionally amide linking group that can optionally include a hydrocarbylene of 1-4 carbon atoms, especially 1 carbon atom,
$\Phi$ is an aryl group of 6-10, especially 6 carbon atoms, and said aryl group may optionally have substituent(s) (up to 5 or 6 for naphthalene or up to 4 for benzene) which may include linear or branched alkyl chains of 1-4 carbon atoms, halides, and/or —NO$_2$, The functionalized polyether defined by the formula $R_1$—$(OC_\delta H_{2\delta})_x$—$(OCH_2CH_2)_y$—W-$\Phi$-COOH can be prepared by the reaction of a polyetheramine and/or a polyetheralcohol with a multi carboxylic acid such as 1,2,4-benzenetricarboxylic acid anhydride or homophthalic acid.

The easiest way to prepare polyetheramines is illustrated in the examples of this specification. Amino functionalized poly(alkylene oxides) are also commercially available from companies such as Huntsman under the names Surfonamines™ or Jeffamines™. Specific examples of Surfonamine™ amines are B100 and B200.

The polyether alcohol may be a polyalkyleneoxide mono-alkyl ether or monoalkaryl ether alcohol. Monoalcohol compounds of this type are commercially available such as polypropyleneglycol monobutyl ether of various molecular weights from Aldrich or under the tradename Synalox™ from Dow or Polyglykol™ from Clariant. Specific examples of Synalox™ are 100-D20, 100-40B, 100-50B, 100-D95 and 100-150B. Specific examples of Polyglykol™ are B01/20, B01/40, B01/80, B01/120 and B01/240. Polypropyleneglycol monoisotridecylether ether is available under the Polyglykol™ tradename from Clariant, a specific example is T01/35.

The aminic polybasic species can be a polyamine such as aliphatic amines, poly(vinylamine), alkylenepolyamine, or polyallylamine or poly(C$_{2-6}$-alkyleneimine) and in one preferred embodiment is polyethyleneimine. The polyamine or polyalkyleneimine may be linear or branched. The polyamine or polyalkyleneimine may have a number average molecular weight of from 100-100,000 g/mole; more desirably from 140 to 75,000; or preferably from 140 to 20,000. The aliphatic polyamines may have from 2 to 6 carbon atom per nitrogen atom and include diethylenetriamine, triethylenetetramine, tetraethylenepentamine, etc., still bottoms, and mixtures thereof. Desirably, the amine polybasic species has a total of at least 3 primary and/or secondary amine groups per molecule and more desirably at least 4 primary and/or secondary amine groups.

The weight ratio of the functionalized polyether to aminic polybasic species is from 10:1 to 60:1, more desirably from 15:1 to 50:1.

The acid functionalized polyether and aminic polybasic species are reacted together such that —CO$_2$H of the acid functionalized polyether reacts with the amine groups in polybasic species to give ionic salt bonds and/or covalent bonds or a mixture of ionic salt bonds and covalent bonds, especially ionic salt bonds.

The mono-nucleophilic polyetheramine and/or polyether alcohol is reacted with a multi-carboxylic aromatic acid optionally in the presence of an acid catalyst (such as ortho-phosphoric acid) at a temperature between 100° C. to 200° C., more preferably between 120 and 180° C., under an inert atmosphere for 6 to 24 hours to give the functionalized polyether defined by the formula $R_1$—$(OC_\delta H_{2\delta})_x$—$(OCH_2CH_2)_y$—W-$\Phi$-COOH.

The acid functionalized polyether and the polybasic species are reacted together at a temperature between 90° C. to 140° C., preferably between 90° C. and 120° C. under an inert atmosphere (such as nitrogen) for 2 to 8 hours.

In one embodiment, any residual unreacted nitrogen atoms of the aminic polybasic species can be reacted with other electrophiles to provide slightly different properties. In one embodiment, the reaction product from reacting the acid functionalized polyether with the polybasic species can be further functionalized to adapt their properties and application performance to specific requirements. The modification reactions below may be combined where necessary, to give multiple reaction products of acid modified polyether with polybasic addition compounds. Where two or more modifying reactions are to be carried out in succession, it should be ensured that enough residual aminic groups are available that are reactive for one or more subsequent reactions in the molecule.

The stated modifications are advantageous embodiments of the present invention and can be realized by:
a) reaction of one or more of the remaining free amino groups of the aminic polybasic species with isocyanates, lactones, anhydrides, epoxides, cyclic carbonates, or (meth)acrylates;
b) salification and/or reaction of one or more of the remaining free amino groups of the aminic polybasic species with mono or polycarboxylic acids, mineral acids, phosphorus and polyoxometallate containing acids or strong acids;
c) oxidation of one or more of the of the remaining free amino groups of the aminic polybasic species to nitrogen oxides;
d) quaternization of one or more of the remaining free amino groups of the aminic polybasic species; or
e) reaction of one or more of the remaining free amino groups of the aminic polybasic species with one or more mono amino-reactive group terminated polymer(s) of MW 150-3000.

The modification of any remaining amino groups may take place in a way which is known to the skilled person. For example, salification and quaternization of the amino nitrogen atom can be achieved using mineral acids, strong acids, alkyl sulfates, alkyl or aralkyl halides, halocarboxylic esters, alkyl oxalates or epoxides. Quaternization is desirable when, for example, amino groups will react with a binder system into which the pigment paste is incorporated and cause flocculation. Suitable reagents for this purpose include hydrochloric acid, acetic acid, sulphuric acid, alkyl sulphonic acids, alkyl hydrogen sulphates or aryl sulphonic acids. Quaternizing agents include dimethyl sulphate, benzyl chloride, methyl halides such as chlorine, bromine and iodine, dimethyl oxalate, ethylene oxide, propylene oxide and styrene oxide in the presence of acids, and propane (or butane) sultone.

Salification and/or reaction of one or more of the remaining free amino groups of the aminic polybasic species with mono or polycarboxylic acids or phosphorus containing acids are disclosed in JP 9 157 374, US 2010/0017973 and US2013/0126804. Specific examples of suitable mono carboxylic acids include optionally substituted $C_{1-50}$ aliphatic monocarboxylic acids such as acetic acid, propionic acid, caproic acid, caprylic acid, 2-ethylhexanoic acid, nonanoic acid, decanoic acid, lauric acid, myristic acid, palmitic acid, oleic acid, linoleic acid, stearic acid, arachidic acid, erucic acid, behenic acid, methoxyacetic acid, mixtures of fatty acids derived from oils from naturally occurring sources such as sunflower oil, rape seed oil, castor oil and olive oil, branched alkyl carboxylic acids available under the trademark Isocarb™ (ex Sasol), Unicid™ acids which are linear $C_{25-50}$ synthetic primary acids commercially available from Baker Hughes and aromatic carboxylic acids such as benzoic acid, salicylic acid and naphthoic acid. Specific examples of suitable polycarboxylic acids include succinic acid, malonic acid, adipic acid, sebacic acid, malic acid, fumaric acid, citric acid and tartaric acid. Specific examples of suitable phosphorus containing acids include phosphoric acid and phosphorous acid. Specific examples of suitable polyoxometallate containing acids include phosphomolybdic acid, phosphotungstic acid and silicomolybdic acid.

Reaction of one or more of the remaining free amino groups of the aminic polybasic species with anhydrides are disclosed in U.S. Pat. Nos. 6,878,799 and 7,767,750. Specific examples of suitable anhydrides include maleic anhydride, succinic anhydride, phthalic anhdride, tetrahydrophthalic anhydride, methyltetrahydrophthalic anhydride, hexahydrophthalic anhydride, methylhexahydrophthalic anhydride, trimellitic anhydride, $C_{1-20}$ alkenyl and alkyl succinic anhydrides.

Reaction of one or more of the remaining free amino groups of the aminic polybasic species with a epoxide is disclosed in JP 4 031 471. Specific examples of suitable epoxides include styrene oxide, propylene oxide and ethylene oxide.

Reaction of one or more of the remaining free amino groups of the aminic polybasic species can occur with carboxylic acid, sulfonic acid, sulfuric acid, phosphonic acid, phosphoric acid, isocyanate, epoxide, (meth)acrylate, acetoacetoxy or cyclocarbonate terminated polymers. The reaction products can be in the form of an amide and/or the corresponding salt when a carboxylic acid terminated polymer is used, a salt when sulfonic acid, sulfuric acid, phosphonic acid and phosphoric acid terminated polymers are used and a covalent bond is formed between the NH functionality of the amino group and i) an isocyanate terminated polymer to give a urea, ii) an epoxide terminated polymer to ring open the epoxy group giving an amino alcohol, and iii) a (meth)acrylate terminated polymer via a Michael addition across the double bond. These mono-reactive terminated polymers can be based on polyesters, polyethers, polyether/polyester, polyamide, polyesteramide, poly(meth)acrylates, polyurethanes and mixtures thereof. Particularly useful mono-reactive polymers have been disclosed in various patents.

Suitable examples of carboxylic acid terminated polyester, polyesteramide and polyamide polymers are disclosed in U.S. Pat. Nos. 4,224,212, 4,861,380, 5,700,395, 5,760,257, 6,197,877, 8,202,935, JP 4 866 255, JP 8 010 601, JP 9 157 361, WO 2006/113258 and WO 2007/039605 in which;

a) the polyesters are derived from the polymerisation of:—
one or more of a hydroxycarboxylic acid and/or a lactone optionally in the presence of initiator molecules containing a carboxylic acid or ester functionality; or one or more of a diol with one or more of a dibasic acid/anhydride optionally in the presence of initiator molecules containing a carboxylic acid or ester functionality;

b) the polyesteramides are derived from the polymerisation of:—
one or more of a hydroxycarboxylic acid and/or a lactone with one or more of an aminocarboxylic acid and/or a lactam optionally in the presence of initiator molecules containing a carboxylic acid or ester functionality; and c) the polyamides are derived from the polymerisation of:—
one or more of an aminocarboxylic acid and/or a lactam optionally in the presence of initiator molecules containing a carboxylic acid or ester functionality; or one or more of a diamine with one or more of a dibasic acid/anhydride optionally in the presence of initiator molecules containing a carboxylic acid or ester functionality.

Specific examples of suitable hydroxycarboxylic acids and lactones include ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid, glycolic acid, β-propiolactone, β-butyrolactone, optionally $C_{1-6}$-alkyl substituted ε-caprolactone and optionally $C_{1-6}$-alkyl substituted δ-valerolactone such as ε-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactone, δ-valerolactone, β-methyl-δ-valerolactone or mixtures thereof.

Specific examples of suitable diols include alkylene glycols such as ethylene glycol, propylene glycol, neopentyl glycol, 1,4-butanediol, 1,6-hexanediol, diols with ether linkages such as diethylene glycol, dipropylene glycol, tripropylene glycol and triethylene glycol. Examples of suitable polyalkylene glycols include polyethylene glycols, polypropylene glycols, polybutylene glycols, mixed block and random copolymers of polyethylene glycol and polypropylene glycol (Pluronic™ and Reverse Pluronic™ ex BASF) with MW less than 1000.

Specific examples of suitable dibasic acids and anhydrides include maleic anhydride, succinic anhydride, glutaric anhydride, fumaric acid, malonic acid, adipic acid, sebacic acid, phthalic anhydride, and cyclohexane dicarboxylic anhydride.

Specific examples of suitable aminocarboxylic acids include sarcosine, beta-alanine, 4-aminobutyric acid, 6-aminocaproic acid and 11-aminoundecanoic acid.

Specific examples of suitable lactams include laurolactam and caprolactam.

Specific examples of suitable diamines include alkylene diamines such as ethylenediamine, 1,2-propylenediamine, 1,3-propylene diamine, the isomeric butylenediamines, pentanediamines, hexanediamines, heptanediamines, 1,12-diaminododecane, diaminocyclohexanes, and diamines with ether linkages such as 1,2-bis(2-aminoethoxy)ethane. Examples of suitable polyetherdiamines include Jeffamine™ diamines commercially available from Huntsman such as D230, D400, ED600.

Examples of suitable initiator molecules containing a carboxylic acid or ester group include optionally substituted $C_{1-50}$ aliphatic monocarboxylic acids as described above and their methyl or ethyl esters.

Suitable examples of phosphate, sulphate and sulphonate terminated polyester polymers are disclosed in U.S. Pat. Nos. 4,861,380 and 6,197,877 in which the polyesters are derived from the polymerisation of hydroxycarboxylic acids and/or lactones as disclosed above using initiator molecules containing a hydroxyl or amino functionality. Specific examples of suitable initiator molecules containing a hydroxyl functionality include alcohols with optionally substituted C1-50 hydrocarbylene groups such as methanol, ethanol, propan-1-ol, propan-2-ol, butanol, isobutanol, neopentyl alcohol, hexanol, octan-1-ol, 2-ethylhexanol, decanol, dodecanol, oleyl alcohol, stearyl alcohol, behenyl alcohol, cyclohexanol, benzyl alcohol, phenol, octylphenol, nonylphenol, phenylethanol, fluorinated alcohols such as 1H,1H,2H,2H-perfluoro-1-decanol, C8-36 branched alcohols available under the trademark Isofol™ (ex Sasol), Unilin™ alcohols which are linear $C_{25-50}$ synthetic primary alcohols commercially available from Baker Hughes. Specific examples of suitable initiator molecules containing an amino functionality include amines such as butylamine, dodecylamine, stearylamine.

Suitable examples of (meth)acrylate terminated polyester, polyesteramide and polyamide polymers are disclosed in EP 713 894, JP 3 488 001, JP2010222522 and U.S. Pat. No. 8,202,935 in which the polyesters are derived from the polymerisation of hydroxycarboxylic acids and/or lactones as disclosed above using:—
  i) initiator molecules such as 2-hydroxyethylacrylate directly;
  ii) initiator molecules containing a hydroxyl functionality then subsequent transesterification reaction with a (meth)acrylate ester;
  iii) initiator molecules containing a carboxylic acid or ester functionality as described above and then subsequent reaction with a (meth)acrylate ester containing a hydroxyl functionality such as 2-hydroxyethylacrylate or an epoxy functionality such as glycidyl methacrylate.

Suitable examples of phosphate, sulphate and sulphonate terminated polyether, polyether/polyester, polyether/polyurethane and polyether/polyester/polyurethane polymers are disclosed in U.S. Pat. Nos. 5,130,463, 5,151,218, 6,111,054, 6,310,123, 7,595,416 and 8,202,935 in which the polyethers are derived from the polymerisation of alkylene and alkarylene oxides such as ethylene oxide, propylene oxide, butylene oxide and styrene oxide using initiator molecules containing a hydroxyl or amino functionality as disclosed above. These polyether mono alcohols can be further reacted with one or more hydroxycarboxylic acids or lactones as disclosed above or with diols and diacids as described above to give the polyether polyester polymers containing an alcohol group which can then be phosphated as disclosed in U.S. Pat. No. 5,130,463. The polyether mono alcohols and polyether polyester monoalcohols can be reacted further with diols as disclosed above in combination with diisocyanates to give polyether polyurethane and polyether polyester polyurethane polymers respectively containing an alcohol group which can then be phosphated as disclosed in U.S. Pat. No. 5,130,463. Specific examples of suitable diisocyanates include hexamethylenediisocyanate (HDI), 2,4- and 2,6-toluenediisocyanate (TDI), isophoronediisocyanate (IPDI), α,α-tetramethylxylene diisocyanate (TMXDI), diphenylmethane-4,4'-diisocyanate (4,4'-MDI), diphenylmethane-2,4'-diisocyanate (2,4'-MDI) and dicyclohexylmethane-4,4'-diisocyanate (HMDI).

Suitable examples of (meth)acrylate terminated polyether polymers are disclosed in U.S. Pat. No. 7,923,474 and JP2010222522.

Suitable examples of carboxylic acid terminated polyether polymers are disclosed in JP 4 248 207, U.S. Pat. Nos. 7,767,750, 7,671,119, 7,872,070, 8,076,409 and 8,168,713 in which polymers are derived from i) the reaction of polyalkyleneglycol mono substituted ethers with halocarboxylate salts such as sodium monochloroacetate and then acidified using hydrochloric acid; ii) the reaction of polyalkyleneglycol mono substituted ethers with acrylonitrile and then hydrolysed in the presence of acids such as hydrochloric acid; and iii) the reaction of polyetheramines with anhydrides.

Suitable examples of isocyanate terminated polyester and polyether polymers are disclosed in JP 4 031 471, JP 7 149 855 and WO2007/039605

Suitable examples of epoxide or acetoacetoxy or cyclocarbonate terminated polyacrylate polymers are disclosed in U.S. Pat. No. 5,100,969.

The radical copolymerizable unsaturated resin composition containing the compatibilizing agent of the present invention is composed of a radical copolymerizable unsaturated resin such as, for example, unsaturated polyester, vinyl ester resin, vinyl urethane resin or acrylic resin; an addition polymerized polymer; and a polymerizable unsaturated monomer. If necessary, various additives such as polymerization inhibitors, curing catalysts, fillers, reinforcing particulate, internal mold-releasing agents, and pigments can be added.

The composition of the unsaturated polyester which can be used in the present invention includes, but is not specifically limited to, an unsaturated polyester obtained from the reaction of an α,β-unsaturated carboxylic acid or in somecase, an α,β-unsaturated carboxylic acid containing a saturated carboxylic acid with a polyhydric alcohol.

Examples of the α,β-unsaturated carboxylic acid include fumaric acid, maleic acid, maleic anhydride, itaconic acid, citraconic acid, mesaconic acid, chloromaleic acid, dimethyl esters thereof and the like. These α,β-unsaturated carboxylic acids may be used alone or in combination. Other unsaturated and saturated carboxylic acids include, for example, phthalic acid, phthalic anhydride, isophthalic acid, terephthalic acid, HET(R) acid (Occidental Chemical), hexahydrophthalic anhydride, tetrahydro phthalic anhydride, adipic acid, sebacic acid, azelaic acid or the like. These saturated carboxylic acids may be used alone or in combination.

The polyhydric alcohol includes, for example, diols such as ethylene glycol, diethylene glycol, propylene glycol, dipropylene glycol, trimethylene glycol, 1,3-butane diol, 1,4-butane diol, 2-methyl-1,3-propane diol, 1,6-hexane diol, cyclohexane diol, neopentyl glycol, 2,2,4-trimethyl-1,3-pentane diol, 1,4-cyclohexane dimethanol; glycols such as hydrogenated bisphenol A, alkylene oxide adducts of hydrogenated bisphenol A, alkylene oxide adducts of bisphenol A; triols such as trimethylol propane; or tetraols such as pentaerythritol. These polyhydric alcohols may be used alone or in combination.

In addition, the resulting unsaturated polyester may be modified with an epoxy compound such as glycidyl methacrylate, and bisphenol A epoxy, or an isocyanate compound such as toluene diisocyanate and isopropenyl-dimethyl-benzyl isocyanate.

There can be also used dicyclopentadiene unsaturated polyester obtained by adding dicyclopentadiene to the α,β-unsaturated carboxylic acid, saturated carboxylic acid and polyhydric alcohol and reacting them.

A PET unsaturated polyester, which is obtained by using a glycol decomposition product obtained by reacting recovered polyethylene-terephthalate (PET) with a polyhydric alcohol at high temperature as a principal raw material, reacting it with the α,β-unsaturated carboxylic acid, saturated carboxylic acid and polyhydric alcohol, can be used in the present invention without causing any problem.

The vinyl ester resin used in the present invention is a reaction product obtained by the reaction between an epoxy resin and an unsaturated monocarboxylic acid.

The epoxy resin includes, for example, glycidyl ethers of polyvalent phenols such as bisphenol A epoxy resin, bisphenol F epoxy resin, phenol novolac epoxy resin, cresol novolac epoxy resin and brominated epoxy resin; glycidyl ethers of polyvalent alcohols such as dipropylene glycol diglycidyl ether, trimethylolpropane triglycidyl ether, diglycidyl ether of bisphenol A alkylene oxide adduct and diglycidyl ether of hydrogenated bisphenol A; alicyclic epoxy resins such as 3,4-epoxy-6-methylcyclohexylmethyl-3,4-epoxy-6-methylcyclohexane carboxylate and 1-epoxyethyl-3,4-epoxycyclohexane; glycidyl esters such as diglycidyl phthalate, diglycidyl tetrahydrophthalate, diglycidyl p-oxybenzoic acid and glycidyl dimer acid; glycidylamines such as tetraglycidylaminodiphenylmethane, tetraglycidyl m-xylylenediamine, triglycidyl p-aminophenol and N,N-diglycidylaniline; heterocyclic epoxy resins such as 1,3-diglycidyl-5,5-dimethylhydantoin and triglycidyl isocyanate; and the like. These epoxy resins may be used alone or in combination.

The unsaturated monocarboxylic acid includes, for example, acrylic acid, methacrylic acid, crotonic acid, cinnamic acid, acrylic acid dimer, monomethyl maleate, monomethyl fumarate, monocyclohexyl fumarate or sorbic acid. These acids may be used alone or in combination.

The resulting vinyl ester resin may be further modified with an acid anhydride such as maleic anhydride, succinic anhydride and acetic anhydride or an isocyanate compound such as toluene diisocyanate, isopropenyl-dimethyl-benzyl isocyanate.

A vinyl urethane resin is an oligomer obtained from polyol compounds, organic polyisocyanate compounds, or hydroxyl-containing (meth)acrylates. The polyol compound refers to a generic name of a compound having within a molecule plural hydroxyl groups, but may be a compound having a functional group which has an active hydrogen capable of reacting with an isocyanate group in place of a hydroxyl group, for example, carboxyl group, amino group, mercapto group. Such a polyol compound includes, for example, polyester polyol, polyether polyol, acrylic polyol, polycarbonate polyol, polyolefin polyol, castor oil polyol, or caprolactone polyol. These polyol compounds may be used alone or in combination. As the organic polyisocyanate compound, there can be used those described below.

Typical examples of the organic polyisocyanate compound include 1,6-hexamethylene diisocyanate, trimethylhexamethylene diisocyanate, 4,4-diphenylmethane diisocyanate, tolylene diisocyanate, xylylene diisocyanate, naphthalene diisocyanate, 1,4-cyclohexane diisocyanate, 4,4-dicyclohexylmethane diisocyanate, isophorone diisocyanate, hydrogenated xylylene diisocyanate and the-like. In addition, a multimer obtained by isocyanating each type of isocyanate compound can be included. They are used alone or in combination.

An acrylic resin is composed of a thermoplastic acrylic polymer derived from (meth)acrylate and a polymerizable unsaturated monomer containing (meth)acrylate as a principal component and polymerizable unsaturated monomers. It can be obtained by polymerizing a mixed monomer solution, which contains (meth)acrylate as an essential component and, if necessary, other polymerizable unsaturated monomers capable of copolymerizing with the (meth)acrylates. The acrylic polymer preferably has a molecular weight of 100,000 or less because it is used in a form of syrup dissolved in the polymerizable monomer. The acrylic polymer can be obtained by a common polymerization procedure such as suspension polymerization and solution polymerization. Also, the syrup obtained by prepolymerizing the monomers in a degree of 10-40% can be used as it is.

Typical, examples of the polymerizable unsaturated monomer, which can be used in the radical copolymerizable unsaturated resin composition, include known styrenes, acrylates, methacrylates, diallylphthalates, carboxylic vinyl esters, vinyl ethers and the like. However, it is not specifically limited thereto, and can be used by suitably selecting various unsaturated monomers depending on use of the resin solution and required performance.

The amount of the polymerizable unsaturated monomer is not specifically limited, but is preferably within a range of 10-70% by weight, and more preferably within a range of 20-50% by weight, based on (modified) unsaturated polyester, vinyl ester resin, vinyl urethane resin or acrylic resin. The ratio of the radical polymerizable unsaturated resin to the polymerizable unsaturated monomer is preferably within a range from 30-90% by weight to 10-70% by weight, and more preferably within a range from 50-80% by weight to 20-50% by weight, in the resin composition.

The polymerization inhibitor, which can be used in the resin composition of the present invention, is not specifically limited and any conventionally known polymerization inhibitors can be used. Specific examples thereof include hydroquinone, trimethyl hydroquinone, p-tert-butyl catechol, tert-butyl hydroquinone, toluhydroquinone, p-benzoquinone, naphthoquinone, hydroquinone monomethyl ether, phenothiazine, copper naphthenate, copper chloride and the like. These polymerization inhibitors may be used alone, or used after mixing two or more sorts thereof. The amount of the polymerization inhibitor is not specifically limited.

As the curing agent, which can be employed in the resin composition of the present invention, is not specifically limited and any conventionally known curing agents can be used. Examples thereof include one or more selected from heat-curing agents, ultraviolet-curing agents, electron radiation-curing and the like. The amount of the curing agent is preferably within a range of 0.1-10 parts by weight, and particularly within a range of 1-5 parts by weight based on 100 parts by weight of the resin composition.

The heat-curing agent includes an organic peroxide, for example, known diacyl peroxide, peroxy ester, hydroperoxide, ketone peroxide, alkyl perester, percarbonate compounds. The heat-curing agent can be appropriately selected according to the molding condition.

The ultraviolet-curing agent is a photosensitizer, for example, known acylphosphine oxide, benzoyl ether, benzophenone, acetophenone, thioxantone compounds. The ultraviolet-curing agent can be appropriately selected according to the molding condition. The electron radiation-curing agent includes halogenated alkylbenzene, disulfide compounds and the like.

Examples of the additive capable of accelerating curing (curing accelerator) which is used in combination with the above described curing agent includes, but is not limited to, metal salts such as cobalt naphthenate and cobalt octanoate, tertiary aromatic amines such as N,N-dimethylaniline, N,N-di(hydroxyethyl) p-toluidine and dimethylacetoacetamide and the like. They are selected, if necessary.

Typical examples of the filler, which can be used in the resin composition of the present invention, include calcium carbonate, magnesium carbonate, barium sulfate, mica, talc, kaolin, clay, Celite, asbestos, perlite, baryta, silica, quartz sand, dolomite, limestone, gypsum, aluminum fine-powder, hollow balloon, alumina, glass powder, cellulosic powder, aluminum hydroxide, white marble, zirconium oxide, antimony trioxide, titanium oxide, molybdenum dioxide and the like. These fillers are selected in view of the workability, strength and appearance of the resulting molded article, economical efficiency and the like, but calcium carbonate, aluminum hydroxide, silica, and talc are commonly used. The filler also includes surface-treated one.

The reinforcing particulate which can be used in the resin composition of the present invention may be those which are usually used as fiber reinforcing agents. Examples thereof include glass fiber, polyester fiber, phenol fiber, polyvinyl alcohol fiber-, aromatic polyamide fiber, nylon fiber, carbon fiber and the like. These reinforcing agents may be in the form of chopped strand, chopped strand mat, roving, textile and the like. These reinforcing agents are selected in view-of the viscosity of the composition, strength of the resulting molded article and the like.

Examples of the internal mold-releasing agent, which can be used in the resin composition of the present invention, include higher fatty acid such as stearic acid; higher fatty acid salt such as zinc stearate; and alkyl phosphate. However, it is not specifically limited thereto and various mold-releasing agents selected suitably depending on the molding condition can be used Typical examples of the pigment, which can be used in the resin composition of the present invention include, inorganic pigments such as titanium white and carbon black, and organic pigments such as phthalocyanine blue and quinacridone red. Various pigments can be used depending on color phase. In general, the pigments are often added as a toner in which the pigments are uniformly dispersed into an unsaturated polyester resin and the like. If an electrically conductive or static electric dissipative molded part is desired a conductive pigment and/or electrically conductive additives can be added to the molding composition.

Other various additives includes viscosity modifiers such as viscosity reducing agents, defoaming agents, silane coupling agents, air-blocking agents such as paraffin and the like. Commercially available products can be used.

When preparing molding materials such as sheet molding compound (hereinafter referred to as SMC) and bulk molding compound (hereinafter referred to as BMC), the thickening agent includes metal oxides, hydroxides such as magnesium oxide and calcium hydroxide and multifunctional isocyanate compounds such as crude MDI. However, the thickening agent is not specifically limited thereto and various thickening agents selected suitably depending on use of the molding material and required performance can be used. In general, magnesium oxide capable of easily controlling the degree of thickening is used.

In the present invention, the addition polymerized polymer (thermoplastic resin), which is mixed with the radical polymerizable unsaturated resin is not specifically limited, but an addition polymerized polymer which exerts desired effects such as low profile and improvement of physical properties (fracture toughness, etc.) can be suitably selected depending on use of molding, molding condition and the like and used. Typical examples thereof include polystyrene resin containing styrene as a principal component, for example, polystyrene, styrene-((meth)acrylic ester) copolymer, styrene-(conjugated diene) block copolymer, hydrogenated styrene-(conjugated diene) block copolymer and the like. In addition, no styrene containing (meth)acrylate polymer, for example, poly(methyl methacrylate), poly(n-butyl acrylate) ester and the like is also included. There can be also used those obtained by reacting double bonds in these polymers with other compounds.

The styrene-(conjugated diene) block copolymers are block copolymers made of styrene components obtained by polymerizing styrene with conjugated butadiene and conjugated diene components. As the conjugated diene components, there can be used butadiene, isoprene, 1,3-pentadiene and the like. In addition, styrene-hydrogenated conjugated diene block copolymer obtained by hydrogenating these styrene-(conjugated diene) block copolymer may be also used. The unit of the block copolymer is not specifically limited, but includes repeat units of styrene and conjugated diene such as styrene-(conjugated diene), styrene-(conjugated diene)-styrene, and (conjugated diene)-styrene-(conjugated diene). Specific examples thereof include styrene-butadiene block copolymer, styrene-isoprene block copolymer, styrene-(ethylene butylene) block copolymer, styrene-(ethylene propylene) block copolymer and the like.

The resin composition of the present invention can be used as, for example, a molding material (for press molding and injection molding as SMC and BMC, spray molding, hand lay-up molding, casting, pultrusion), coating material (paint, putty, cosmetic plate, sealing material, and lining material). The molding material of the present invention contains resin compositions, polymerization inhibitors, curing agent, fillers, reinforcing agents, and if necessary, various additive such as internal mold-releasing agents and pigments.

Examples of the molding article of the present invention include house equipment such as bathtub, kitchen counter, lavatory, waterproof pan and septic tank; civil building materials such as artificial marble, panel, corrugated board, drawn material and polymer concrete; marine structures such as boat and ship; automobile parts such as lamp reflector; commodities such as buttons and bowling ball; and the like.

The following Examples further illustrate the present invention, but the present invention is not limited to these examples. In the following Examples, parts are by weight unless otherwise stated.

EXAMPLES

Reagents

PAG 1, Polyether amine, consisting of C12-15 alcohol reacted with propylene oxide (MW 1660), followed by base catalyzed addition of the resultant polyetheralcohol to acrylonitrile and subsequent hydrogenation to give an amine (85% active) available from Lubrizol.

PAG 2, Polyether amine, consisting of C12-15 alcohol reacted with butylene oxide (MW 1700), followed by base catalyzed addition of the resultant polyetheralcohol to acrylonitrile and subsequent hydrogenation to give an amine (80% active) ex Lubrizol.

1,2,4-benzene tricarboxylic anhydride, available from Sigma Aldrich Polypropylene glycol) monobutyl ether molecular weight 1000 g/mole available from Sigma-Aldrich.

Homophthalic acid, available from Sigma Aldrich
Orthophosphoric acid catalyst, available from Fisher
Surfonamine™ B100, molecular weight 1000 g/ml available from Huntsman
Surfonamine™ B-200 molecular weight 2000 g/mole available from Huntsman
EPOMIN™ SP-200 a polyethyleneimine of Mw 10,000 g/mole available from Nippon Shokubai
EPOMIN™ SP-018 a polyethyleneimine of Mw 1800 g/mole available from Nippon Shokubai
EPOMIN™ SP-006 a polyethyleneimine of Mw 600 g/mole available from Nippon Shokubai
Tetraethylene pentamine, available from Sigma Aldrich
Triethylenetetramine, available from Sigma Aldrich
Styrene, available from Sigma Aldrich
Palapreg™ H814-01, a low profile additive comprising polystyrene in styrene, available from DSM
Palapreg™ P17-02, an unsaturated polyester resin from orthophthalic acid and standard diols available from DSM
Intermediates
Intermediate 1

Example 1

PAG 1, 79.91 parts by weight (PAG 1=Polyether amine, consisting of C12-15 alcohol reacted with propylene oxide (MW 1660), followed by base catalyzed addition of the resultant polyetheralcohol to acrylonitrile and subsequent hydrogenation to give an amine (85% active) available from Lubrizol) is charged to a reaction flask and heated, under a nitrogen blanket, to 70° C. whilst stirring. Once up to temperature 1,2,4-benzene tricarboxylic anhydride (MW 192.13, Ex Sigma Aldrich, 5.72 parts) is charged to the flask then heated to 120° C. and stirred for 8 hours, giving a brown liquid. This is intermediate 1.
Intermediate 2

Example 2

Polypropylene glycol) monobutyl ether (MW 1000, Ex Sigma Aldrich, 75.78 parts), Homophthalic acid (MW 180.16, Ex Sigma Aldrich, 13.69 parts), and Orthophosphoric acid catalyst (Ex Fisher, 0.27 parts) are charged to a reaction flask and heated, under a nitrogen blanket, to 180° C. and stirred for 14 hours, giving a product of a brown liquid. This is intermediate 2.
Intermediate 3

Example 3

Surfonamine B100 (MW 1000, Ex Huntsman, 91.74 parts) is charged to a reaction flask and heated, under a nitrogen blanket, to 70° C. then 1,2,4-benzene tricarboxylic anhydride (MW 192.13, Ex Sigma Aldrich, 17.62 parts) is charged to the flask and heated to 120° C. and stirred for 14 hours, giving a product of a brown liquid. This is intermediate 3.
Intermediate 4

Example 4

PAG 2 94.2 parts (PAG 2=Polyether amine, consisting of C12-15 alcohol reacted with butylene oxide (MW 1700), followed by base catalyzed addition of the resultant polyetheralcohol to acrylonitrile and subsequent hydrogenation to give an amine (80% active) ex Lubrizol) and 1,2,4-Benzene tricarboxylic anhydride (MW 192.13, Ex Sigma Aldrich, 7.8 parts) are charged to a reaction flask and heated, under a nitrogen blanket, to 80° C. and stirred for 3 hours, then heated to 120° C. and stirred for 12 hours, then heated to 150° C. and stirred for 8 hours, giving a product of a brown liquid. This is intermediate 4.
Intermediate 5

Example 5

Surfonamine B200 (MW 2435, Ex Huntsman, 89.32 parts) is charged to a reaction flask and heated, under a nitrogen blanket, to 70° C. then 1,2,4-Benzene tricarboxylic anhydride (MW 192.13, Ex Sigma Aldrich, 7.047 parts) is charged to the flask and heated to 120° C. and stirred for 11.5 hours, then heated to 150° C. for 4 hours, giving a product of a brown liquid. This is intermediate 5.
Agents

Example 6

Intermediate 1 (56.29 parts) is charged to a reaction flask and heated, under nitrogen, to 90° C., charged preheated EPOMIN SP-018 (MW 1800, Ex Nippon Shokubai, 3.75 parts) and stirred for 1.5 hours, then heated to 120° C. and stirred for 1 hour, giving a brown viscous liquid product. This is Agent 1.

Example 7

Intermediate 1 (74.22 parts) is charged to a reaction flask and heated, under nitrogen, to 70° C., charged preheated EPOMIN SP-200 (MW 10,000, Ex Nippon Shokubai, 3.17 parts) then heated to 120° C. and stirred for 6 hours, giving a brown viscous liquid product. This is Agent 2.

Example 8

Intermediate 1 (64.6 parts) is charged to a reaction flask and heated, under nitrogen, to 70° C., charged preheated EPOMIN SP-018 (MW 1800, Ex Nippon Shokubai, 2.48 parts) then heated to 120° C. and stirred for 6 hours, giving a brown viscous liquid product. This is Agent 3.

Example 9

Intermediate 1 (64.94 parts) is charged to a reaction flask and heated, under nitrogen, to 70° C., charged preheated EPOMIN SP-200 (MW 10,000, Ex Nippon Shokubai, 2.17 parts) then heated to 120° C. and stirred for 6 hours, giving a brown viscous liquid product. This is Agent 4.

Example 10

Intermediate 1 (33.98 parts) is charged to a reaction flask and heated, under nitrogen, to 70° C., charged preheated EPOMIN SP-200 (MW 10,000, Ex Nippon Shokubai, 0.97 parts) then heated to 120° C. and stirred for 6 hours, giving a brown viscous liquid product. This is Agent 5.

Example 11

Intermediate 1 (109.98 parts) is charged to a reaction flask and heated, under nitrogen, to 70° C., charged preheated EPOMIN SP-200 (MW 10,000, Ex Nippon Shokubai, 2.75 parts) then heated to 120° C. and stirred for 6 hours, giving a brown viscous liquid product. This is Agent 6.

Example 12

Intermediate 1 (52.69 parts) is charged to a reaction flask and heated, under nitrogen, to 90° C., charged preheated EPOMIN SP-018 (MW 1800, Ex Nippon Shokubai, 1.06 parts) and stirred for 1.5 hours, then heated to 120° C. and stirred for 1 hour, giving a brown viscous liquid product. This is Agent 7.

Example 13

Intermediate 1 (73.44 parts) is charged to a reaction flask and heated, under nitrogen, to 90° C., charged preheated Tetraethylenepentamine (MW 189.30, Ex Sigma Aldrich, 2.82 parts) stirred for 1.5 hours, then heated to 120° C. and stirred for 1 hour, giving a brown viscous liquid product. This is Agent 8.

Example 14

Intermediate 1 (37.46 parts) is charged to a reaction flask and heated, under nitrogen, to 90° C., charged preheated Triethylenetetramine (MW 146.23, Ex Sigma Aldrich, 1.44 parts) stirred for 1.5 hours, then heated to 120° C. and stirred for 1 hour, giving a brown viscous liquid product. This is Agent 9.

Example 15

Intermediate 1 (20.76 parts) is charged to a reaction flask and heated, under nitrogen, to 90° C., charged preheated EPOMIN SP-006 (MW 600, Ex Nippon Shokubai, 0.8 parts) stirred for 1.5 hours, then heated to 120° C. and stirred for 1 hour, giving a brown viscous liquid product. This is Agent 10.

Example 16

Intermediate 2 (42.75 parts) is charged to a reaction flask and heated, under nitrogen, to 70° C., charged preheated EPOMIN SP-200 (MW 10,000, Ex Nippon Shokubai, 2.51 parts) then heated to 120° C. and stirred for 6 hours, giving a brown viscous liquid product. This is Agent 11.

Example 17

Intermediate 3 (66.78 parts) is charged to a reaction flask and heated, under nitrogen, to 90° C., charged preheated EPOMIN SP-018 (MW 1800, Ex Nippon Shokubai, 2.56 parts) stirred for 1.5 hours, then heated to 120° C. and stirred for 1 hour, giving a brown viscous liquid product. This is Agent 12.

Example 18

Intermediate 4 (40.52 parts) is charged to a reaction flask and heated, under nitrogen, to 70° C., charged preheated EPOMIN SP-200 (MW 10,000, Ex Nippon Shokubai, 1.35 parts) then heated to 120° C. and stirred for 6 hours, giving a brown viscous liquid product. This is Agent 13.

Example 19

Intermediate 5 (47.27 parts) is charged to a reaction flask and heated, under nitrogen, to 90° C., charged preheated EPOMIN SP-018 (MW 1800, Ex Nippon Shokubai, 1.82 parts) stirred for 1.5 hours, then heated to 120° C. and stirred for 1 hour, giving a brown viscous liquid product. This is Agent 14.

Resin Separation Test

Each example additive (0.5 parts of active content) Styrene monomer (2 parts) and PALA H814-01 resin (11.25 parts) are charged to a Dispermat pot and mixed with a saw tooth impellor at 2000 rpm for 5 minutes. P17-02 resin (11.25 parts) is charged to the pot and mixed at 2000 rpm for 5 minutes. The mixture is decanted to a glass vial and sealed. This is observed and when separation of the material is seen this is recorded.

TABLE 1

| Agent | Last observed no separation | First observed separation. |
|---|---|---|
| No agent | 20 mins | 30 mins |
| Agent 1 | 6 hours | 24 hours |
| Agent 2 | 48 hours | 72 hours |
| Agent 3 | 96 hours | 168 hours |
| Agent 4 | 72 hours | 96 hours |
| Agent 5 | 48 hours | 72 hours |
| Agent 6 | 6 hours | 24 hours |
| Agent 7 | 6 hours | 24 hours |
| Agent 8 | 24 hours | 48 hours |
| Agent 9 | 48 hours | 72 hours |
| Agent 10 | 72 hours | 96 hours |
| Agent 11 | 6 hours | 24 hours |
| Agent 12 | 6 hours | 24 hours |
| Agent 13 | 48 hours | 72 hours |
| Agent 14 | 216 hours | 240 hours |

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

The terms "hydrocarbyl" or "hydrocarbylene" denotes a group having a carbon atom directly attached to the remainder of the molecule and having a hydrocarbon or predominantly hydrocarbon character within the context of this invention. Such groups include the following: (1) Purely hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc. (2) Substituted hydrocarbon groups; that is, groups containing non-hydrocarbon substituents which do not alter the predominantly hydrocarbon character of the group. Those skilled in the art will be aware of suitable substituents. Examples include hydroxy, nitro, cyano, alkoxy, acyl, etc. (3) Hetero groups; that is, groups which, while predominantly hydrocarbon in character, contain atoms other than carbon in a chain or ring otherwise composed of carbon atoms. Suitable hetero atoms will be apparent to those skilled in the art and include, for example, nitrogen, oxygen and sulphur.

As described hereinafter, the number average molecular weight of the polymer of the present invention has been determined using known methods, such as GPC analysis using a polystyrene standard for all polymer chains except those that contain ethylene oxide. The number average molecular weight of a polymer chain containing ethylene oxide is determined by GPC (THF eluent, PEG Standards).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein the term "hydrocarbylene" is used in the ordinary sense of the term and is intended to include any divalent radical formed by removing two hydrogen atoms from a hydrocarbon.

As used herein, the term "alk(en)ylene" is used in the ordinary sense of the term and is intended to include an alkylene and/or an alkenylene group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A unsaturated resin molding composition comprising an additive to prevent phase separation,
an addition polymerized polymer (D) for low profile characterized as having a number average molecular weight above 50,000 g/mole and existing as a dispersed phase in said composition,
a radical copolymerizable unsaturated resin, and
a polymerizable unsaturated monomer,
wherein said additive to prevent phase separation comprises a reaction product of a functionalized polyether of a formula:
$R_1$—$(OC_\delta H_{2\delta})_x$—$(OCH_2CH_2)_y$—W-Φ-COOH with an aminic polybasic species having at least 3 primary and/or secondary amine groups per molecule and a number average molecular weight of from 100 to 100,000 g/mole in a weight ratio of said $R_1$—$(OC_\delta H_{2\delta})_x$—$(OCH_2CH_2)_y$—W-Φ-COOH:aminic polybasic species of 10:1 to 60:1,
wherein:
$R_1$ is a $C_1$-$C_{36}$ hydrocarbyl group which can be a cyclic, branched, or non-branched alkyl; aryl; alkylaryl or arylalkyl,
δ is 3 and/or 4,
x is 10-60,
y is 0-10,
the —$(OC_\delta H_{2\delta})$ and —$(OCH_2CH_2)$ repeat units can be in any order such as random or blocky and y must be less than x,
W is an ester, imide, or optionally amide linking group that can optionally include a hydrocarbylene of 1-4 carbon atoms,
Φ is an aryl group of 6-10 carbon atoms and said aryl group can optionally have substituent(s) which include linear or branched alkyl chains of 1-4 carbon atoms, halides, and/or —$NO_2$.

2. The unsaturated resin composition according to claim 1, wherein the weight ratio of said $R_1$—$(OC_\delta H_{2\delta})_x$—$(OCH_2CH_2)_y$—W-Φ-COOH to said aminic polybasic species is from 15:1 to 50:1.

3. The unsaturated resin composition according to claim 1, wherein said aminic polybasic species has a number average molecular weight from about 140 to about 75,000 g/mole.

4. The unsaturated resin composition according to claim 1, wherein x is from 10 to 40.

5. The unsaturated resin composition according to claim 1, wherein W comprises an ester linkage.

6. The unsaturated resin composition according to claim 1, wherein W comprises an imide linkage.

7. The unsaturated resin composition according to claim 1, wherein said aminic polybasic species has a number average molecular weight from about 140 to about 20,000 g/mole.

8. The unsaturated resin composition according to claim 1, wherein the radical copolymerizable unsaturated resin is an unsaturated polyester or a vinyl ester resin.

9. The unsaturated resin composition according to claim 1, wherein said low profile additive is a styrene homopolymer or a copolymer with at least 33 wt. % repeat units derived from styrene monomer.

10. The unsaturated resin composition according to claim 1, wherein the aminic polybasic species is polyethyleneimine.

11. The unsaturated resin composition according to claim 1, wherein the weight ratio of radical copolymerizable unsaturated resin:polymerizable unsaturated monomer is from 30-90:10-70.

12. The unsaturated resin composition according to claim 1, wherein said composition further comprises at least 3 wt. % chopped, woven, or wound fibers based on the total weight of said unsaturated resin molding composition.

13. A molded article comprising the unsaturated resin composition of claim 1 after molding, polymerization of said unsaturated monomer and crosslinking of said unsaturated resin.

14. The unsaturated resin composition according to claim 1, wherein the amount of said additive to prevent phase separation is within a range of about 0.5 to about 5 parts by weight based on the total amount of the unsaturated resin and unsaturated monomer being 100 parts by weight.

15. The unsaturated resin composition according to claim 1, wherein said additive to prevent phase separation being a reaction product of a functionalized polyether of formula $R_1$—$(OC_\delta H_{2\delta})_x$—$(OCH_2CH_2)_y$—W-Φ-COOH with an aminic polybasic species comprises one or more unreacted amino groups that is further functionalized by a salification reaction with an acid species selected from the group of mono or polycarboxylic acids, mineral acids, phosphorus and polyoxometallate containing acids or strong acids.

16. The unsaturated resin composition according to claim 2, wherein said aminic polybasic species has a number average molecular weight from about 140 to about 75,000 g/mole and x is from 10 to 40.

17. The unsaturated resin composition according to claim 16, wherein said aminic polybasic species has a number average molecular weight from about 140 to about 20,000 g/mole and wherein the radical copolymerizable unsaturated resin is an unsaturated polyester or a vinyl ester resin.

18. The unsaturated resin composition according to claim 17, wherein the weight ratio of radical copolymerizable unsaturated resin:polymerizable unsaturated monomer is from 30-90:10-70.

19. The unsaturated resin composition according to claim 18, wherein said low profile additive is a styrene homopolymer or a copolymer with at least 33 wt. % repeat units derived from styrene monomer.

20. The unsaturated resin composition according to claim 18, wherein the aminic polybasic species is polyethyleneimine.

* * * * *